Patented July 22, 1941

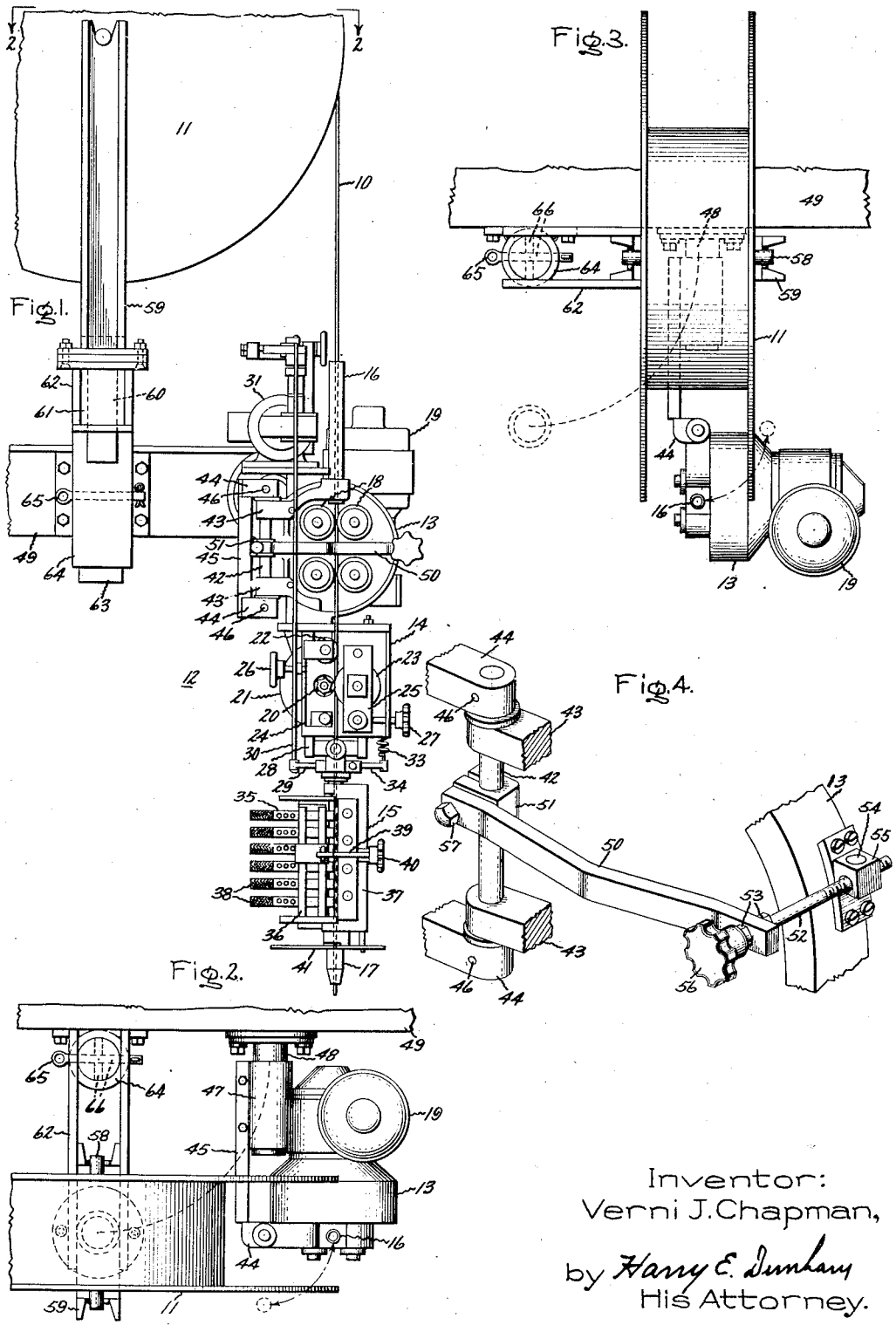

2,250,219

UNITED STATES PATENT OFFICE 2,250,219

WELDING APPARATUS

Verni J. Chapman, Schenectady, N. Y., assignor to General Electric Company, a corporation of New York Application November 29, 1940, Serial No. 367,777

6 Claims. (Cl. 219—8)

My invention relates to welding apparatus particularly suited for automatic arc welding with heavy coated electrodes supplied from a continuous coil.

Repetitive welding operations often can be profitably handled with automatic arc welding equipment, especially where the seams are of relatively simple contour such as circles or straight lines. Where the deposited weld metal must be of shielded-arc quality, heavy coated electrodes should be used. The use of heavy coated electrodes necessitates the use of an automatic arc welding head embodying means for feeding the electrode, means for lengthwise slitting its coating and means for supplying welding current to the electrode through the slit in its coating produced by the slitting means.

To obtain uniform results, it has been found that the slit in the electrode coating must line up with the seam during welding. Consequently, in order to adapt automatic arc welding heads for heavy coated electrodes to the welding of transverse seams, a support must be provided for the welding head so that it may be swung from one position to another in order properly to align the slit in the electrode with the seam being welded. For example, when welding the longitudinal and circumferential seams of a tank, the welding head mounting must be such as to permit it being swung through an angle of 90°. Also to provide means for compensating for small variations in the position of the seam being welded, a manually operated cross-feed adjustment which is effective in any position to which the welding head may be swung, must also be provided.

When electrode material is supplied from a continuous coil to such an automatic arc welding head, it has been found that when the electrode is made of a soft material, it receives as a result of its coiling a permanent set which interferes with the proper operation of the welding head when it is swung from one position to another. Consequently, some means must be provided for positioning the coil of electrode relative to the welding head when the welding head is swung from one position to another so that the plane of curvature of that portion of the electrode withdrawn from the coil is always in substantially the same position relative to the slitting and contact means of the welding head.

It is an object of my invention to provide a support and cross-feed adjustment for an automatic arc welding head by means of which the welding head may be swung from one position to another, held in a desired position and adjusted a slight amount from this position by a cross-feed adjustment.

It is also an object of my invention to provide positioning means whereby a coil of heavy coated electrode may be positioned relatively to an automatic welding head suitable for feeding heavy coated electrodes when the welding head is swung from one position to another so that the plane of curvature of that portion of the electrode withdrawn from its coil is always in substantially the same position relative to the slitting and contact means of the welding head.

Further objects of my invention will become apparent from the following description of one embodiment thereof illustrated in the accompanying drawing.

In this drawing, Fig. 1 is a front view of a support for a coil of heavy coated electrode and a support for an automatic arc welding head by means of which the electrode coil and automatic arc welding head may be positioned relative to one another and the work for welding transverse seams; Fig. 2 is a plan view of the apparatus shown in Fig. 1; Fig. 3 is a plan view of the apparatus of Fig. 1 showing an adjustment of the coil and welding head supports for welding seams at 90° to those welded when the supports are in the positions illustrated in Figs. 1 and 2; and Fig. 4 is a detail view of the cross-feed adjustment forming part of the welding head support.

In Fig. 1 a coil of heavy coated electrode 10 is supported on a reel 11 from which it is withdrawn by a welding head 12 and fed to the work to strike and maintain a welding arc.

This welding head comprises means 13 for feeding the electrode, means 14 for lengthwise slitting its coating, and means 15 for connecting a source of current thereto through the slit produced by means 14. An electrode guide 16 is provided for directing the electrode 10 into the welding head and a guide 17 is provided for positioning the arcing terminal of the electrode relatively to the work being welded.

The electrode feeding means 13 comprises two pairs of feed rolls 18 which engage and propel electrode 10. Each pair of feed rolls is positioned opposite one another and mounted for rotation with a pair of shafts spaced from one another by a fixed distance in the frame of the feeding means. These shafts are geared together and connected through gearing with a feed motor 19. This feed motor forms part of an automatic arc welding control which, as usually constituted, comprises means responsive to a characteristic of the welding circuit for controlling its speed and direction of rotation, and consequently the speed and direction of rotation of the feed rolls in a manner to control electrode feeding for striking and maintaining a welding arc. The feed rolls are made of an elastic material such as rubber and their diameters are adjusted through compression exerted on their sides so as to adapt the feeding mechanism for feeding electrodes of different sizes. The construction of the electrode feeding means is more fully described and claimed in the copending application of Jasper E. Anderson, Serial No. 367,559, filed Nov. 28, 1940, for "Arc welding head" and assigned to the assignee of my present invention.

The coating slitter 14 comprises saw-tooth cutter 20 of tungsten carbide or other material which is driven by a motor 21. This cutter produces a narrow slit in the heavy coating of the electrode which exposes it to the contact fingers of contact means 15. Cutter 20 is mounted on the shaft of cutter motor 21 and to permit accurate positioning of the cutter, this motor is provided with an adjustable mounting. Once located, the cutter remains fixed in position, the depth of cut being regulated by changing the location of the electrode with respect to the cutter.

The location of the electrode with respect to the cutter is controlled by grooved rolls 22 and 23 carried by pivotally mounted members 24 and 25, each of which are adjusted by its own hand wheel 26 or 27. The right hand roll 23 takes the thrust of the cutter while the left hand roll 22 maintains the electrode in contact with roll 23, thereby preventing lateral movement of the electrode. To increase the depth of cut, roll 22 is backed off slightly by an adjustment of hand wheel 26 and roll 23 is moved nearer the cutter by an adjustment of hand wheel 27. The adjustment of these hand wheels causes movement of the pivoted members 24 and 25 within which these rolls are mounted. Under normal conditions, the depth of cut is just sufficient to cut through the coating to expose the electrode but not to cut into it.

The mechanism above described which forms part of this coating slitter, although exposed to view in the drawing, is in reality enclosed and means are provided for exhausting the particles of fluxing material removed from the electrode when producing a slot therein.

This coating slitter is mounted below the electrode feeding means by being bolted to a boss forming part of the frame of the electrode feeding means. The contact means 15 is in turn attached to the lower portion of the electrode slitter 14 through a universal joint 28 which permits oscillation of the contact means in either of two directions. Lock nuts are provided to restrict movement of the joint to either one of its two axes about which the contact mechanism may oscillate. An arm 29 angularly disposed between the intersecting axis of the pivotal mounting is conntected through a vertical rod 30 to an oscillating mechanism 31 mounted on a boss forming part of the frame of the electrode feeding means 13. The oscillating mechanism also includes a biasing spring 33 which is connected between the coating slitter frame and an arm 34 which is oppositely disposed to arm 29. The universal joint construction, and the oscillator mechanism above described, is essentially the same as that disclosed and claimed in my United States Letters Patent 2,198,472 of April 23, 1940, for "Oscillator mechanism."

The contact mechanism 15 comprises six contact fingers 35 which are positioned in a frame 36 so as to engage the electrode through the slit made in its coating by the electrode slitter 14. These contact fingers are spring pressed into engagement with the electrode which is supported by grooved guide rolls located in the body portion 37 of the contact mechanism. Connections between one terminal of the welding current source and the contact fingers 35 are completed through flexible conductor straps 38. Frame 36 which supports the contact fingers 35 is hinged to the body portion 37 of the contact mechanism and held in the position illustrated by a latch 39 provided with a hand wheel 40. This contact mechanism is also provided with a heat shield 41 in order to protect it from the heat of the welding arc and fumes and spatter resulting from welding operations. The construction of this contact mechanism is more fully described in my copending application Serial No. 367,778, filed Nov. 29, 1940, for "Contact mechanism" and assigned to the assignee of my present invention.

The welding head embodying the several parts above described is mounted for swinging movement about a hinge pin 42 through the agency of hinge lugs 43 forming part of the frame of the electrode feeding means 13. This pin is held against rotation in lugs 44 of a bracket 45 by pins 46. Bracket 45 is also provided with a sleeve clamp 47 by which it is mounted on an arm 48 forming part of a flanged member which is bolted to but electrically insulated from a main support 49. This main support may be the travel carriage frame of a welding machine. The insulation between arm 48 and main support 49 is provided in order to prevent flow of current between electrode 10 and cutter 20 for, due to the contact between the cutter and the electrode, the welding head is at the same potential as the electrode.

A lever 50 extending across and in front of the electrode feeding mechanism 13 is provided for holding the welding head in any desired position to which it may be swung about pin 42. A clamp 51 at one end of this lever 50 is hinged on and releasably clamped to pin 42 and its other end is attached through an adjustable spacing device to the frame 13 of the electrode feeding means. This adjustable spacing device comprises a threaded shaft 52 which is rotatably supported in lever 50 and held against lengthwise movement relative thereto by nuts 53. The connection between lever 50 and shaft 52 is also such as to permit a slight pivotal movement between the two. The threaded end of shaft 52 passes through a nut 54 which is rotatable about an axis parallel to the longitudinal axis of pin 42 in a bracket 55 attached to frame 13 of the electrode feeding means. The openings in bracket 55 through which adjusting screw 52 extends are sufficiently large to permit swinging movement of shaft 52 relative thereto about the axis of nut 54. A hand wheel 56 is provided for turning shaft 52 in order to operate the spacing device.

It will thus be seen that by releasing clamp 51 the welding head may be swung about pin 42 to any desired position and thereafter held in this desired position by again tightening clamp 51. The release and tightening of clamp 51 is controlled by a bolt 57 forming part of clamp 51. After clamp 51 has been tightened in order to locate the welding head in a desired adjusted position about pin 42, further adjustment of the welding head about pin 42 is provided by the spacing device embodying threaded shaft 52. Thus by turning hand wheel 56, which rotates this shaft, a small cross-feed adjustment is provided for the welding head after it has been locked in position on pin 42.

As previously stated, the slit in the electrode coating must always line up with the weld in order to secure the best welding conditions. Consequently, when welding a tank, the welding head must be swung from the position shown in Figs. 1 and 2, which is suitable for making a longitudinal seam, to the position illustrated in Fig. 3, which is suitable for making a circumferential seam. This repositioning of the welding head also requires a repositioning of the electrode coil and its reel 11. As pointed out above, if this new positioning of the electrode coil is not made, the curvature of that portion of the electrode withdrawn from the reel will change so that it has a tendency either to ride up in the grooves of the guide rolls in coating slitter 14 and contact mechanism 15 or shift these guide rolls the distance permitted by end play between them and their support. When the welding head is swung from one position to another, the electrode coil must consequently be repositioned relative to the welding head so that the plane of curvature of that portion of the electrode withdrawn from the coil is always in substantially the same position relative to the slitting and contact mechanisms of the welding head. The coil support illustrated in the accompanying drawing makes it possible to accomplish this result.

The coil of electrode is carried by a reel 11 which is mounted for rotation about an axle 58 whose ends rest in the notched ends of a forked member 59. This forked member is provided at its lower end with a shaft 60 which is electrically insulated from that portion of the forked member which engages the reel 11. Shaft 60 is mounted for rotation in a bearing 61 which is located at the outer end portion of an arm 62 whose inner end portion is provided with a shaft 63 which rotates within a bearing 64 attached to the main supporting frame 49. Shaft 63 may be held in either of two positions at right angles to one another by means of a pin 65 which passes through bearing 64 and through either one of the other of passageways 66 in shaft 63 or it may be clamped in any desired position.

With the arrangement provided for supporting the electrode coil, it will be noted that when the welding head is swung from the position shown in Figs. 1 and 2 to the position shown in Fig. 3, reel 11 may be swung on arm 62 from the position illustrated in Figs. 1 and 2 and simultaneously rotated about the longitudinal axis of shaft 60 and bearing 61 through 180° to the position illustrated in Fig. 3 in order to supply electrode to the welding head under identical conditions for each positioning of the welding head. This will be productive of the desired results; namely, eliminating difficulties from a permanent set in the electrode resulting from it being supplied from a coil.

In view of the embodiment of my invention above described, both as to structure and function, it is apparent that many modifications will suggest themselves to those skilled in the art. Thus while I have shown but one embodiment of my invention, I do not desire my invention to be limited to the particular construction shown and described, but intend in the appended claims to cover all modifications within the true spirit and scope of my invention.

What I claim as new and desire to secure by Letters Patent of the United States is:

1. Arc welding apparatus comprising an arc welding head, a non-rotatable pin, means for hinging said welding head about said pin, means including a lever releasably clamped to said pin and attached to said welding head for holding said welding head in any desired position to which it may be swung about said pin, and means including an adjustable spacing device between said lever and said welding head for adjusting said welding head about said pin when said lever is clamped to said pin.

2. Arc welding apparatus comprising an arc welding head, a non-rotatable pin, means for hinging said welding head about said pin, a lever hinged on said support pin and releasably clamped thereto, and means for adjusting the spacing of said lever and said welding head relatively to one another.

3. Arc welding apparatus comprising an arc welding head, a non-rotatable pin, means for hinging said welding head about said pin, a lever, a releasable clamp connecting said lever and said pin, an adjusting screw connecting said lever and said welding head, and means for rotating said adjusting screw.

4. Arc welding apparatus comprising an arc welding head in which means for feeding a flux coated electrode from a coil thereof is combined with means for lengthwise slitting the coating on said electrode and for supplying welding current thereto through said slit, a non-rotatable pin, means offset from one side of said welding head for hinging it about said pin, a lever extending across and in front of said welding head, a releasable clamp for connecting one end of said lever and said support pin, a threaded shaft rotatably supported from the other end of said lever and held against lengthwise movement relative thereto, a nut threaded on said shaft, means on and offset from the other side of said welding head for supporting said nut for turning motion about an axis parallel to the axis of said pin, and means for rotating said shaft to adjust said welding head relative to said lever.

5. Arc welding apparatus comprising an arc welding head in which means for feeding a flux coated electrode from a coil thereof is combined with means for lengthwise slitting the coating on said electrode and for supplying welding current thereto through said slit, a support for said welding head, means for swinging said welding head from one position to another about said support to align the slit in said electrode with seams transverse to one another in the work to be welded, a support for a continuous coil of said electrode, and means for positioning said coil support relatively to said welding head when said welding head is swung from one position to another so that the plane of curvature of that portion of said electrode withdrawn from said coil is always in substantially the same position relative to the slitting and contact means of said welding head.

6. Arc welding apparatus comprising an arc welding head in which means for feeding a flux coated electrode from a coil thereof is combined with means for lengthwise slitting the coating on said electrode and for supplying welding current thereto through said slit, a support for said welding head, means for swinging said welding head from one position to another about said support to align the slit in said electrode with seams transverse to one another in the work to be welded, a support for a continuous coil of said electrode, and means for swinging and turning said coil support into the same position relative to said welding head when said welding head is swung from one position to another to align the slit in said electrode with said transverse seams.

VERNI J. CHAPMAN.